United States Patent
Andgart et al.

(10) Patent No.: US 8,744,020 B2
(45) Date of Patent: Jun. 3, 2014

(54) FREQUENCY OFFSET ESTIMATION

(75) Inventors: Niklas Andgart, Södra Sandby (SE); Fredrik Nordström, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 447 days.

(21) Appl. No.: 13/127,044

(22) PCT Filed: Oct. 30, 2009

(86) PCT No.: PCT/EP2009/064399
§ 371 (c)(1), (2), (4) Date: Jul. 10, 2011

(87) PCT Pub. No.: WO2010/060732
PCT Pub. Date: Jun. 3, 2010

(65) Prior Publication Data
US 2011/0261909 A1 Oct. 27, 2011

Related U.S. Application Data

(60) Provisional application No. 61/112,490, filed on Nov. 7, 2008.

(30) Foreign Application Priority Data

Nov. 3, 2008 (EP) .................................... 08168187

(51) Int. Cl.
*H04L 27/06* (2006.01)

(52) U.S. Cl.
USPC ............... 375/344; 375/326; 455/71; 455/75; 455/136; 455/139; 455/196.1; 455/255; 455/260; 455/316; 702/106

(58) Field of Classification Search
CPC .............. H04L 27/014; H04L 27/2657; H04L 2027/0016; H04L 2027/0014; H04L 2027/0026; H04L 2027/0044; H04L 2027/0065; H04L 2027/0067

USPC .............. 375/326, 341, 346, 344; 455/71, 75, 455/136, 164.1, 164.2, 165.1, 173.1, 182.1, 455/182.2, 183.1, 183.2, 196.1, 255, 260, 455/316, 139; 702/106
See application file for complete search history.

(56) References Cited

U.S. PATENT DOCUMENTS 7,333,573 B2 * 2/2008 Higure ........................ 375/344
7,853,418 B2 * 12/2010 Mikkonen ..................... 702/66

(Continued)

FOREIGN PATENT DOCUMENTS

JP 04130843 5/1992
WO 2007/129258 A2 11/2007

(Continued)

OTHER PUBLICATIONS

PCT International Search Report, mailed Feb. 23, 2010, in connection with International Application No. PCT/EP2009/064399.

*Primary Examiner* — Sophia Vlahos
(74) *Attorney, Agent, or Firm* — Potomac Patent Group PLLC

(57) ABSTRACT

A frequency offset of a received signal comprising a number of subsequently received data symbols is estimated. A first estimate is determined from a calculated change in phase of the received signal between two received symbols having a first time distance between them. At least one further estimate is determined from a calculated change in phase of the received signal between two received symbols having a different time distance. A frequency periodicity is determined for each estimate from the distance between the two received symbols from which the estimate was determined. A set of integer values is determined for each estimate so that frequency values calculated for each estimate as the frequency periodicity multiplied by the integer value added to the estimate are at least approximately equal to each other, and a corrected estimate of the frequency offset is determined from the integer values.

20 Claims, 7 Drawing Sheets

(56) References Cited

U.S. PATENT DOCUMENTS

2002/0114270 A1 8/2002 Pierzga et al.
2004/0202234 A1 10/2004 Wang
2007/0268976 A1 11/2007 Brink et al.

FOREIGN PATENT DOCUMENTS

WO 2008/006650 A1 1/2008
WO 2008/006662 A1 1/2008

* cited by examiner

FREQUENCY OFFSET ESTIMATION

CROSS REFERENCE TO RELATED APPLICATIONS

This application claims priority under 35 U.S.C. §119 to European Patent Application No. EP 08168187.6, filed on Nov. 3, 2008, which is hereby incorporated herein by reference in its entirety. This application also claims the benefit of U.S. Provisional Application No. 61/112,490, filed Nov. 7, 2008, which is hereby incorporated herein by reference in its entirety.

TECHNICAL FIELD

Embodiments of the present invention relates to estimating a frequency offset of a received signal comprising a number of subsequently received data symbols.

BACKGROUND

In mobile communication systems, there is a need to estimate and compensate for frequency offsets. These offsets can be caused by, e.g., low precision clocks or temperature variations, but also Doppler shifts generated when a user equipment is moving towards or away from a base station.

Thus, Automatic Frequency Control (AFC) algorithms are used to alleviate these problems. To estimate the frequency offset, different methods can be used, depending on the type of communication system.

In Orthogonal Frequency Division Multiplexing (OFDM), the frequency offset can, e.g., be estimated by comparing the phase change of received pilot symbols between two different symbols. Under the assumption that the channel is constant during that time, the frequency offset can be estimated by correlating two received pilot symbols. The argument of the result then gives the frequency offset. However, this argument will be a number between $-\pi$ and $\pi$, and therefore the result will only be correct if the absolute value of the phase change between the two different symbols due to the frequency offset is less than $\pi$. Thus there is a limit to the frequency offset that can be detected for a given distance between the two different symbols. The larger the distance between the two different symbols is, the lower is the frequency offset that can be detected.

Thus if the distance between the two different symbols is large, the precision of the estimate is good. However, the larger the distance is, the lower the Nyquist frequency for the frequency offset is. The Nyquist frequency gives the highest frequency offset that can be estimated.

As an example, the pilots in Third Generation (3G) Long Term Evolution (3G LTE), which uses OFDM as multiple access technique in the downlink, could be placed on symbol 0 and 4 in each slot of seven symbols. Thus the shortest distance between two pilots is three symbols, and the Nyquist frequency, i.e. the highest frequency offset that can be estimated without exceeding the $\pi$ limit for the absolute value of the phase change, can be calculated to 2.33 kHz. However, larger frequency offsets, which can thus not be correctly estimated, may well occur.

Thus to work in e.g. a high-speed train scenario, with Doppler frequencies of 1300 Hz with the base station close to the track, the algorithm has to be capable of rapid frequency changes. In particular, since the user equipment in order to conserve battery power may use cycles in which reception is discontinued, the frequency change can be viewed as a frequency jump of 2600 Hz between two measurements. The same applies for other communication systems in which a frequency offset is estimated from a phase change of a received signal over a given time span.

There is a need for an algorithm that is able to handle larger frequency offsets in communication systems.

SUMMARY

Therefore, it is an object of embodiments of the invention to provide a method of estimating a frequency offset of a received signal comprising a number of subsequently received data symbols, which can detect correctly larger frequency offsets than the prior art methods.

According to embodiments of the invention the object is achieved in a method of estimating a frequency offset of a received signal comprising a number of subsequently received data symbols, the method comprising the step of determining a first estimate of said frequency offset from a calculated change in phase of the received signal between two received symbols having a first time distance between them. The object is achieved in that the method further comprises the steps of determining at least one further estimate of said frequency offset from a calculated change in phase of the received signal between two received symbols having a time distance between them, which is different from said first time distance; determining for each of said first and further estimates a frequency periodicity from the distance between the two received symbols from which the estimate was determined; determining a set of integer values comprising an integer value for each of said first and further estimates so that frequency values calculated for each estimate as the frequency periodicity multiplied by the integer value added to the estimate are at least approximately equal to each other, and calculating from the determined set of integer values a corrected estimate of said frequency offset.

When the estimation of a frequency offset is based on a combination of a plurality of estimates, which have been measured over different time spans, these estimates will have a different frequency periodicity, and therefore also frequency offsets beyond the Nyquist frequency for the original estimates can be estimated by comparing possible frequency offset values for the different estimates.

In one embodiment, the step of determining a set of integer values for each estimate comprises the steps of calculating for each estimate and for each of a number of integer values a corresponding frequency value; and comparing the frequency values calculated for different estimates and selecting the integer values for each estimate giving frequency values closest to each other. This embodiment is also useful in noisy environments, where the two relevant calculated frequency values may not exactly coincide.

In another embodiment, which is also useful in noisy environments where the two relevant calculated frequency values may not exactly coincide, the steps of determining a set of integer values for each estimate and calculating a corrected estimate of said frequency offset comprises the steps of calculating for each of a number of combinations of integer values an optimal frequency value as a frequency value that maximizes a probability function; calculating a likelihood for each optimal frequency value; and selecting the optimal frequency value having the largest likelihood as a corrected estimate of said frequency offset.

In still another embodiment, the steps of determining a set of integer values for each estimate and calculating a corrected estimate of said frequency offset comprises the steps of calculating at least one difference between said first and further estimates; comparing (the at least one difference to pre-calculated difference values stored in a table, which for each pre-calculated difference value indicates a corresponding set of integer values; and reading in said table the set of integer values corresponding to the at least one calculated difference.

In the latter embodiment, the step of calculating a corrected estimate of said frequency offset may comprise the step of calculating from the set of integer values read in said table a corrected estimate of said frequency offset for each of said first and further estimates.

The method may in one embodiment further comprise the step of selecting a frequency value corresponding to one of the integer values in the determined set of integer values as the corrected estimate of said frequency offset. In a different embodiment, the method may further comprise the steps of calculating an average value of frequency values corresponding to the integer values in the determined set of integer values; and selecting said average value as the corrected estimate of said frequency offset. In a further embodiment, the method may further comprise the steps of calculating a weighted average value of frequency values corresponding to the integer values in the determined set of integer values; and selecting said weighted average value as the corrected estimate of said frequency offset.

Alternatively, the method may comprise the step of mixing frequency values corresponding to the integer values in the determined set of integer values with weights corresponding to respective signal-to-noise ratios to obtain the corrected estimate of said frequency offset. In this way the best estimate is obtained in noisy environments.

Embodiments of the invention also relate to a receiver arranged to estimate a frequency offset of a received signal comprising a number of subsequently received data symbols, the receiver comprising a first frequency offset estimator configured to determine a first estimate of said frequency offset from a calculated change in phase of the received signal between two received symbols having a first time distance between them. The receiver further comprises at least one further frequency offset estimator configured to determine at least one further estimate of said frequency offset from a calculated change in phase of the received signal between two received symbols having a time distance between them, which is different from said first time distance; means for determining for each of said first and further estimates a frequency periodicity from the distance between the two received symbols from which the estimate was determined; means for determining a set of integer values comprising an integer value for each of said first and further estimates so that frequency values calculated for each estimate as the frequency periodicity multiplied by the integer value added to the estimate are at least approximately equal to each other, and means for calculating from the determined set of integer values a corrected estimate of said frequency offset.

Embodiments corresponding to those mentioned above for the method also apply for the receiver.

Embodiments of the invention also relate to a user equipment comprising such a receiver.

Embodiments of the invention also relate to a computer program and a computer readable medium with program code means for performing the method described above.

BRIEF DESCRIPTION OF THE DRAWINGS

The embodiments of the invention will now be described more fully below with reference to the drawings, in which.

DETAILED DESCRIPTION OF EMBODIMENTS

Embodiments of the present invention can be used in different communication systems in which a frequency offset is estimated from a phase change of a received signal over a given time span. One example of such a system is Orthogonal Frequency Division Multiplexing (OFDM), e.g. as used in Third Generation (3G) Long Term Evolution (3G LTE). This example is used in the following for describing the embodiments of the invention.

In OFDM systems a multi carrier approach, in which an original data stream is multiplexed into a number of parallel data streams with a correspondingly low symbol rate, is used to reduce inter symbol interference (ISI) by reducing the symbol rate without reducing the data rate. The inter symbol interference is caused by delay spread of the channel impulse response for the multipath channel over which the signals are transmitted. Each of the parallel data streams are modulated with a different sub-carrier frequency and the resulting signals are transmitted together in the same band from a transmitter to a receiver. Typically, a high number of different sub-carrier frequencies, i.e. several hundreds or even thousands, will be used, and these frequencies need to be very close to each other. In the receiver a Fast Fourier Transform (FFT) is used for separating the parallel data streams and recovering the original data stream.

Figure 1:
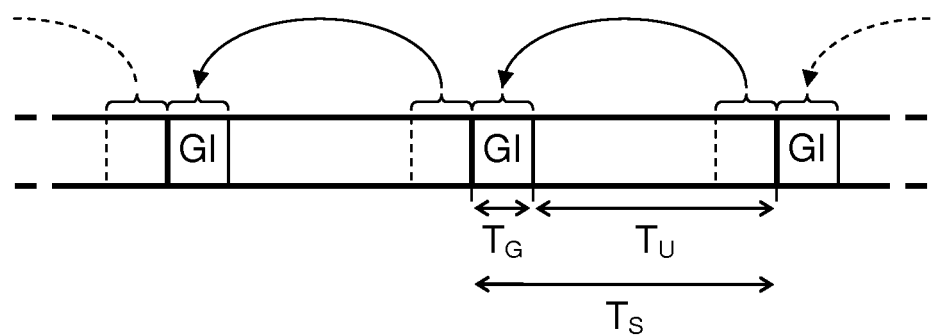
FIG. 1 shows how an OFDM symbol is composed of a useful part and a guard interval.

To further reduce the inter symbol interference, each OFDM symbol constituted by the set of sub-carriers is transmitted with a duration $T_S$, which is composed of two parts, a useful part with duration $T_U$ and a guard interval (GI) or cyclic prefix (CP) with a duration $T_G$. The guard interval consists of a cyclic continuation of the useful part $T_U$ and precedes the symbol as a prefix. This is illustrated in FIG. 1, in which $T_U$ is the length of the useful part of the symbol, while $T_G$ is the length of the guard interval. As long as $T_G$ is longer than the maximum channel delay, all reflections of previous symbols can be removed in the receiver by disregarding the guard interval, and inter symbol interference can thus be avoided.

As one example of a transmission system utilizing OFDM, the proposal for a new flexible cellular system named Third Generation (3G) Long Term Evolution (3G LTE), which can be seen as an evolution of the 3G WCDMA standard, can be mentioned. This system will use OFDM as multiple access technique (called OFDMA) in the downlink and will be able to operate on bandwidths ranging from 1.25 MHz to 20 MHz. Furthermore, data rates up to 100 Mb/s will be supported for the largest bandwidth.

As the OFDM signal comprises many separately-modulated sub-carriers, each symbol may be considered to be divided into "cells", each corresponding to the modulation carried on one sub-carrier during one symbol. Some of these cells are pilot cells that are modulated with reference information, whose transmitted value is known to the receiver. According to 3G LTE nomenclature, the cells may also be referred to as resource elements, and pilot cells may be referred to as pilot symbols, reference symbols or just pilots.

In an OFDM receiver, the received signal is sampled before the parallel data streams are separated in the FFT. The sampling rate $f_s$ equals $N \cdot f_u$, where N is the size of the FFT, i.e. the number of sub-carriers, and $f_u$ is the sub-carrier spacing. This means that during the useful part $T_U$ of the symbol the signal is sampled N times. As an example, in 3G LTE with 20 MHz bandwidth the size of the FFT is N=2048, which means that there are 2048 sub-carriers and 2048 samples during $T_U$. In the version with short CP length, i.e. seven symbols per slot, the number of samples during $T_G$ is 160 for the first symbol of a slot and 144 for the following symbols.

Generally, to ensure synchronization between a receiver and the received signals in a communication system, it is required that time and frequency of the received signals can be estimated accurately in the receiver. Thus in mobile communication systems, there is a need to estimate and compensate for frequency offsets. These offsets can be caused by e.g. low-precision clocks or temperature variations, but also Doppler shifts generated when moving towards or away from a base station. Thus Automatic Frequency Control (AFC) algorithms are used to alleviate these problems. To estimate the frequency offset, different methods can be used, depending on the type of communication system. Frequency estimation algorithms are well known in the art and used e.g. in GSM and WCDMA systems, and they can also be used in OFDM systems. The basic idea with these algorithms is to consider how much the phase has changed between two instants of time. Thus in OFDM the frequency offset can e.g. be estimated by comparing the phase change of the received pilots between two different symbols l and l+l'.

The received signal is modeled as $$r(k,l) = e^{-j2\pi v m_l/N} h(k,l) s(k,l) + w(k,l), \quad (1)$$

where N is the FFT size, k is the subcarrier index, l is the symbol index and v is the frequency offset normalized to the carrier spacing. Further, $m_l$ is the sample index of the start of symbol l, h(k, l) denotes the channel at time position k and frequency position l, s(k, l) is the transmitted signal and w(k, l) is noise.

Thus if e.g. r(k, l+l') and r(k, l) are two samples of the received signal taken l' symbols apart, and if it is further supposed that the corresponding sent signals are identical and the channel is constant, then, loosely speaking, the difference between r(k, l+l') and r(k, l) is a measure of how much things have changed during l' symbols. If, in order to make things more specific, it is supposed that the only reason for change is a normalized frequency offset v, it follows that $$r(k,l+l') = r(k,l) e^{j2\pi v(m_{l+l'} - m_l)/N}. \quad (2)$$

Therefore, algorithms for estimating v are often based on the variable z(k, l) correlating the two received pilot symbols:

$$z(k,l) = r(k,l) r^*(k,l+l') = e^{-j2\pi v(m_{l+l'} - m_l)/N} |h(k,l)|^2 \cdot s(k,l) s^*(k,l+l') + \tilde{w}, \quad (3)$$

because the phase of this variable corresponds to the change in phase of r from symbol l to symbol l+l' under the assumption that the channel h(k, l) is constant during that time.

The normalized frequency offset can then be estimated from the argument of this variable:

$$\hat{v} = \frac{\arg(r(k,l) r^*(k,l+l'))}{2\pi(m_{l+l'} - m_l)/N}. \quad (4)$$

However, the argument function produces a result between $-\pi$ and $\pi$, and therefore the estimation will only be correct if the phase change between the two different symbols due to the frequency offset is within this range. If the "true" phase change is outside this range, it will be replaced by a value within the range and a wrong frequency will be estimated. Thus there is a limit to the frequency offset that can be detected for a given distance between the two different symbols. This limit is defined by the expression $$|2\pi v(m_{l+l'} - m_l)/N| < \pi, \quad (5)$$

which gives $$|v| < \frac{N}{2(m_{l+l'} - m_l)}, \quad (6)$$

or $$|f| < \frac{f_u N}{2(m_{l+l'} - m_l)}, \quad (7)$$

where $f_u$ is the carrier spacing and f is the frequency offset. Thus the right-hand side of expression (7) defines the Nyquist frequency, which is the maximum frequency offset that can be detected.

From the expressions above it can be seen that if the distance $m_{l+l'} - m_l$ is large the precision of the estimate is good, but on the other hand, the larger the distance is, the lower is the Nyquist frequency, which gives the highest frequency offset that can be estimated, as defined by expression (7). This is because a larger distance between the two different symbols increases the possibility of the actual phase change being outside the range $-\pi$ and $\pi$, in which case Equation (4) would present a wrong estimate of the frequency offset.

Figure 2:
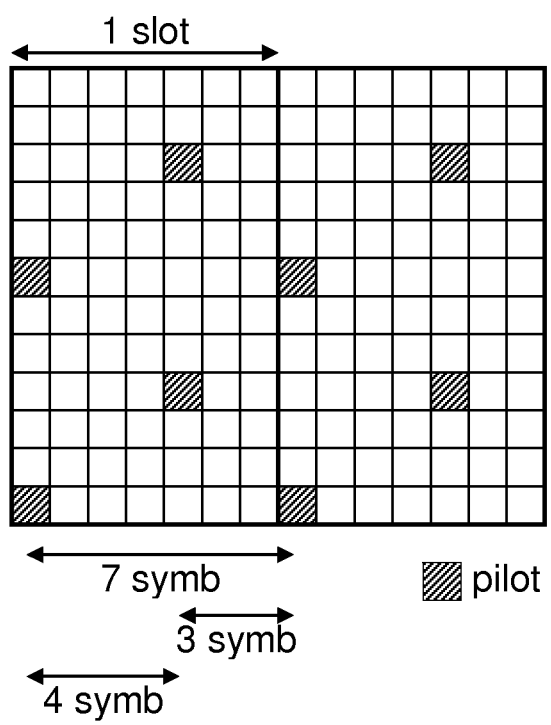
FIG. 2 illustrates the pilot pattern for a 3G LTE system.

In the example mentioned above, i.e. 3G LTE with 20 MHz bandwidth and short CP length, the pilot pattern is illustrated in FIG. 2. As it can be seen, the pilots are placed on the first and fifth symbol (i.e. symbol 0 and 4) in each slot or resource block. The pilots in the fifth symbol are shifted by 3 sub-carriers relative to the pilots in the first symbol. Thus as illustrated in the figure, the frequency offset can be estimated by comparing the phase change between pilots having a distance of e.g. three, four or seven symbols. The shortest distance between two pilots is three symbols. It is noted that the pilots in symbol 0 and 4 are not placed on the same subcarriers, so special arrangements, e.g. averaging between pilots placed on different sub-carriers, have to be used. It will be described later how this can be done. Inserting the number of samples per symbol, and the cyclic prefix lengths, the Nyquist frequency for a distance of three symbols can be calculated according to expression (7) to $$|f| < \frac{f_u N}{2(m_{l+l'} - m_l)} = \frac{15 \text{ kHz} \cdot 2048}{2(3 \cdot 2048 + 2 \cdot 144 + 160)} = 2.33 \text{ kHz}. \quad (8)$$

Using pilots having a distance of four or seven symbols between them for estimating the frequency offset gives a different and smaller Nyquist frequency. For a distance of four symbols the Nyquist frequency is calculated to 1.75 kHz and for seven symbols to 1 kHz.

This means that only frequency offsets in the range from −2.33 kHz to 2.33 kHz can be correctly estimated. However, this is not always sufficient. As an example, it can be mentioned that to work in a high-speed train scenario, with Doppler frequencies of 1300 Hz with the base station close to the track, the algorithm has to be capable of rapid frequency changes. In particular, since the user equipment in order to conserve battery power might use DRX (Discontinue Receiving) cycles, the frequency change can be viewed as a frequency jump of 2600 Hz between two measurements. Thus there is a need for an algorithm that is able to handle larger frequency offsets.

Figure 3:
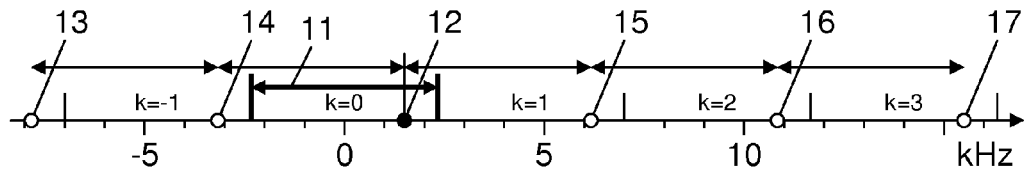
FIG. 3 shows how a frequency offset estimate can represent different true frequency offsets for an estimator having a distance of three symbols between the pilots used for estimation.

If a frequency offset is estimated to $\hat{f}$, it can be seen from the above expressions that the estimate could be equal to the true frequency offset f, but the true frequency offset f could just as well be equal to the estimate plus an unknown number k of the frequency wrap-around or frequency periodicity as defined by expression (7), i.e.

$$f = \hat{f} + k \frac{f_u N}{(m_{l+l'} - m_l)}, \quad (9)$$

where the number k could be positive, negative or zero. This is illustrated in FIG. 3, where the arrow 11 indicates the range calculated in expression (8) for a distance of three symbols between the two pilots. If, as an example, the true frequency offset is as indicated by the black dot 12, i.e. within the Nyquist frequency range, it can be correctly estimated. However, a true frequency offset as indicated by any one of the white dots 13, 14, 15, 16 or 17, which are separated from the black dot 12 by a number of frequency wraps, will also result in an estimate equal to the black dot 12, and therefore it can not be known which one actually corresponds to the true frequency offset. The black dot 12 corresponds to k=0 in Equation (9), while the white dots 13, 14, 15, 16 or 17 correspond to k=−2, −1, 1, 2 and 3, respectively.

Figure 4:
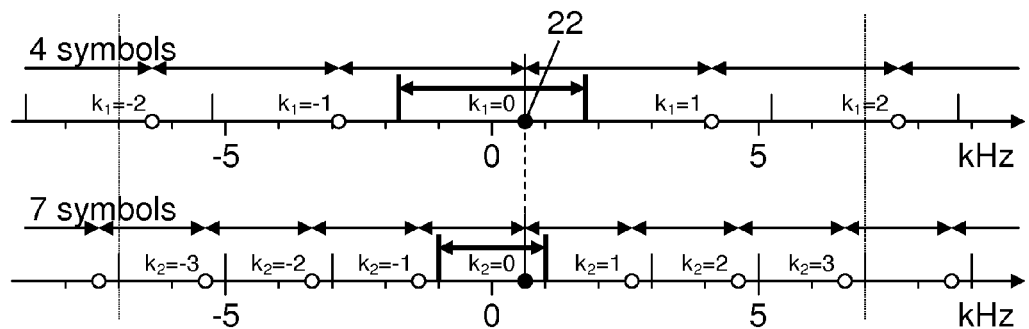
FIG. 4 shows a similar situation for estimators having a distance of four and seven symbols between the pilots used for estimation, where the true frequency to be detected is within the Nyquist frequency for both estimators.

However, depending on the distance between the symbols used in the correlation, different estimators, i.e. estimators using different distances between the pilots, will have wrap-around at different Nyquist frequencies as calculated from Equation (7). For each estimator, the true frequency offset will be the estimated frequency offset plus the ambiguity of the frequency wrap for that estimator. This is illustrated in FIG. 4, which in the same way as in FIG. 3 shows the situation for distances of four and seven symbols between the pilots used for the estimation of the frequency offset.

If the estimation based on four symbols gives a result corresponding to the black dot 22 (around 625 Hz), the true frequency offset could be that estimate or any value corresponding to one of the white dots in the upper part of the figure. Correspondingly, if the estimation based on seven symbols gives a result corresponding to the lower black dot, the true frequency offset could be that estimate or any value corresponding to one of the white dots in the lower part of the figure. In the shown example, the two estimators give the same estimate, i.e. the two black dots coincide at 625 Hz, while none of the white dots for one estimator coincide with white dots for the other estimator. Therefore, in this case the true frequency offset is within the Nyquist frequency range, and the estimate suggested by each estimator is correct.

Figure 5:
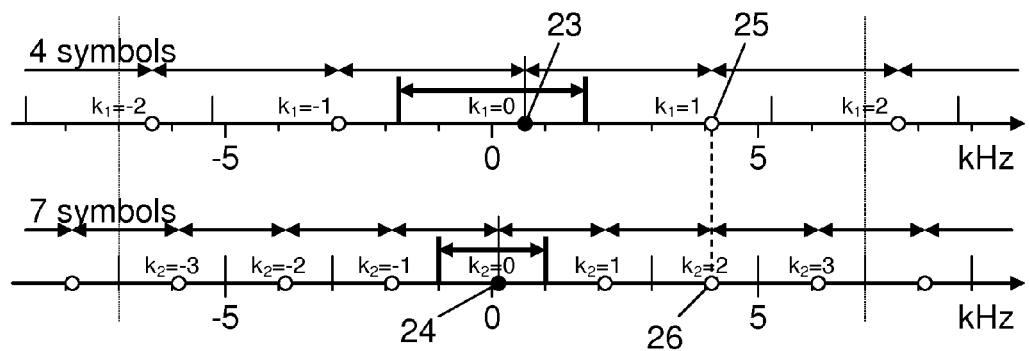
FIG. 5 shows a similar situation for estimators having a distance of four and seven symbols between the pilots used for estimation, where the true frequency to be detected is outside the Nyquist frequency for both estimators.

However, if the true frequency offset is outside the Nyquist frequency range for at least one of the estimators, they will suggest different estimates. This is illustrated in FIG. 5. Here the estimate based on a distance of four symbols between the pilots is again around 625 Hz as indicated by the black dot 23, while the one based on a distance of seven symbols between the pilots is around 125 Hz as indicated by the black dot 24, which indicates that the true frequency offset is outside the Nyquist frequency range for at least one of the estimators. However, it can be seen that the two white dots 25 and 26 for the two estimators coincide at around 4.125 kHz, while the remaining shown dots do not coincide. Therefore, the true frequency offset can be expected to be around the 4.125 kHz.

This knowledge can be used to improve the estimation of the frequency offset by utilizing two different estimators, i.e. with different distances between the pilots, so that also larger frequency offsets can be estimated. Equation (9) can be written for each of the two estimators as $$f = \hat{f}_1 + k_1 \frac{f_u N}{(m_{l_1 + l'_1} - m_{l_1})} \quad (10a)$$

and $$f = \hat{f}_2 + k_2 \frac{f_u N}{(m_{l_2 + l'_2} - m_{l_2})}, \quad (10b)$$

where f is the true frequency offset to be estimated, $\hat{f}_1$ and $\hat{f}_2$ are the two estimates provided by the two estimators and $k_1$ and $k_2$ are the unknown number of frequency wraps for the respective estimator. If the wrap periodicity is different for the two estimators, as in the above example, these equations can be solved to find the only combination of $k_1$ and $k_2$ that works. Then the true frequency offset f is given.

In this way the range in which the frequency offset can be correctly estimated can be enlarged considerably, but there will still be a limit. Instead of the frequency limit being given by the length between the pilot symbols as in Equation (7), the Greatest Common Divisor for the two estimators will specify the length. Using the above example, the Greatest Common Divisor will be 1 for all combinations, and $m_{l+l'} - m_l = 15360/7$. The maximum Nyquist frequency will then be the right-hand side of the inequality $$|f| < \frac{f_u N}{2(m_{l+l'} - m_l)} = \frac{15 \text{ kHz} \cdot 2048}{2 \cdot 15360/7} = 7 \text{ kHz}. \quad (11)$$

Thus in this example the Nyquist frequency for the frequency offset can be increased from 2.33 kHz to 7 kHz. If the true frequency offset is outside this range it can still not be correctly estimated; it will again be estimated as a value within the new range. In FIGS. 4 and 5 this range is indicated by the thin dotted vertical lines at −7 kHz and 7 kHz.

Within this range there will only be a limited number of possible combinations of $k_1$ and $k_2$. Thus in the example, the 7-distance estimator has 7 different $k_2$-values from −3 to 3, and the 4-distance estimator has 5 different $k_1$-values from −2 to 2. It is noted that the 4-distance estimator only needs four wraps to cover the range from −7 to 7 kHz, but since the wrap for $k_1=0$ is centered around 0 kHz, five wraps or five $k_1$-values will be needed, of which only one half of each of the wraps for $k_1=-2$ and $k_1=2$ overlaps the wraps of the 7-distance estimator. This can also be seen in FIGS. 4 and 5. Combining the five $k_1$-values and the seven $k_2$-values gives 35 combinations for which two frequencies can be calculated according to Equations (10a) and (10b). The combination for which the same result is obtained from both equations gives the true frequency offset. In FIG. 4, for the combination $k_1=0$ and $k_2=0$ both equations give a frequency offset of 625 Hz, while two different results are obtained for all other combinations. Similarly, in FIG. 5 both equations give a frequency offset of 4.125 kHz for the combination $k_1=1$ and $k_2=2$, while two different results are obtained for all other combinations. It is noted that not all 35 combinations need to be considered. As an example, a negative $k_1$-value does not need to be combined with a positive $k_2$-value, or vice versa, since for this combination Equations (10a) and (10b) will clearly give different results.

It is noted that in environments with noise and/or interference each of the estimates $\hat{f}_1$ and $\hat{f}_2$ may differ slightly from the values they would have in more ideal environments. This means that also the two f-values that should be equal when calculated from Equations (10a) and (10b) may differ slightly from each other. Therefore, in this case the combination $k_1$ and $k_2$ for which the calculated f-values are at least approximately equal to each other is selected. Here, the term at least approximately equal to each other can e.g. be defined by a predetermined interval within which the difference between the calculated f-values should be, or by selecting the combination $k_1$ and $k_2$ for which the calculated f-values are closest to each other. The predetermined interval can e.g. be determined from the frequency wraps mentioned above.

The concept can be extended to use more than two estimators with different distances between the pilots to further improve noise robustness. Thus when n estimators are used, Equation (9) can instead be written as $$f = \hat{f}_i + k_i \frac{f_u N}{(m_{l_i+l'_i} - m_{l_i})}, \quad (12)$$

where i can be any number from 1 to n. Thus in the above example the frequency offset can be estimated from pilots with distances of 3, 4 and 7 symbols between them.

The embodiments of the invention are thus based on using two or more frequency offset estimators, which have different distances between the wrap points. Different methods can be used to select the correct values of $k_1$ and $k_2$ in Equations (10a/b) or the correct values of $k_i$ in Equation (12). A few examples are described below.

In a noise free environment Equations (10a/b) or (12) can be solved exactly to find the correct values of $k_1$ and $k_2$ or $k_i$, while in a more realistic noisy environment probabilities can be calculated.

Figure 6:
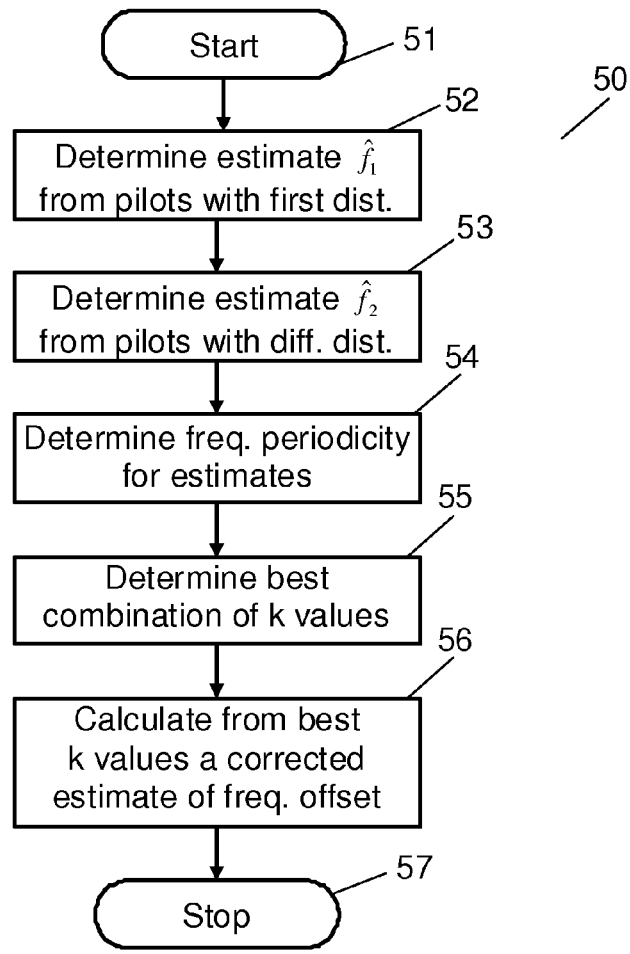
FIG. 6 shows a flow chart illustrating embodiments of the invention.

A flow chart 50 illustrating the idea of an embodiment of the invention is shown in FIG. 6. The procedure starts in step 51. In step 52 the first estimate $\hat{f}_1$ is determined in well known manner, e.g. according to Equation 4, by a first estimator from pilots having a first distance, e.g. four symbols. In step 53 the other estimate $\hat{f}_2$ is determined from pilots having a different distance, e.g. seven symbols. If more than two estimators are used, also the further estimates are determined in this step. Next, in step 54, the frequency periodicity or frequency wrap for each estimator is determined, according to Equation 8. When the frequency periodicities have been determined, the best combination of k-values, i.e. the k-values for which Equations 10a and 10b give equal, or in environments with noise and interference at least approximately equal results, can be determined in step 55. One way to do this is to calculate f-values according to Equation 10a for the possible values of $k_1$ and correspondingly f-values according to Equation 10b for the possible values of $k_2$ and then compare the two sets of calculated f-values to find an f-value that is common for the two sets. In case of noise or interference the two f-values may not be exactly equal, but only approximately equal, so in that case the two f-values closest to each other and their corresponding k-values can be selected, or the two f-values having a difference within a predetermined interval can be selected. Other ways of determining the best combination of k-values are described below. Finally, in step 56 the common f-value corresponding to the selected (best) combination of k-values is selected as the corrected estimate of the frequency offset, or the corrected estimate is calculated from the selected combination of k-values. In the situation where two f-values are not exactly equal, either one of the values, an average value or a weighted average can be selected as the estimate of the frequency offset. The procedure stops in step 57.

Figure 7:
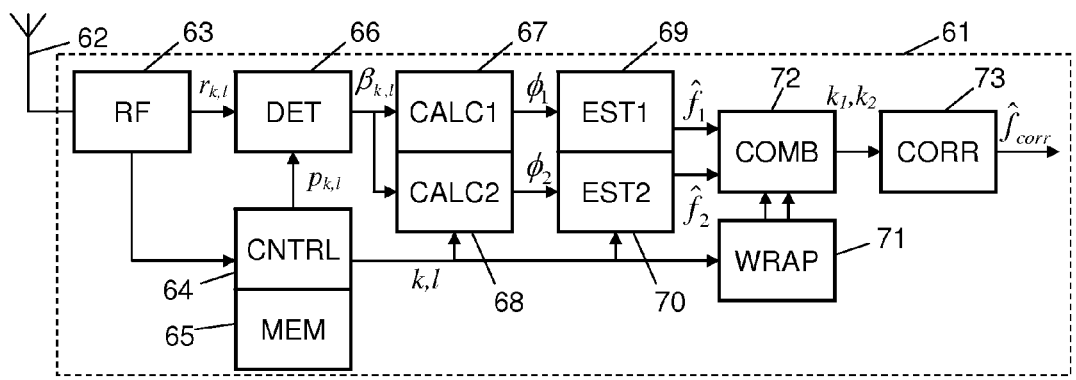
FIG. 7 shows a block diagram of an embodiment of the invention.

A block diagram of a corresponding receiver 61 in which the embodiments of the invention can be implemented is shown in FIG. 7. Signals are received through one or more antennas 62 connected to the receiver and processed by the radio frequency (RF) circuit 63. This part of the circuit is well known and will not be described in further detail here. Regarding the pilots, the output of the circuit 63 will provide the received pilots $r_{k,l}$, while the corresponding sent pilots $p_{k,l}$ are provided by a control circuit 64 connected to a memory 65, since the information content of a pilot symbol is known by the receiver and thus stored in the memory 65. The control circuit 64 also selects the pilots to be used for the calculations. For a given pilot at position (k,l), $r_{k,l}$ and $p_{k,l}$ are compared in the phase detector 66, so that the phase rotation $\beta(k,l)$ between $r_{k,l}$ and $p_{k,l}$ for that pilot is provided. The calculating units 67 and 68 then calculate the rotation differences $\phi_1$ and $\phi_2$ for a distance between the pilots of e.g. four and seven symbols due to the frequency offset. Next, in the frequency offset estimators 69 and 70 the calculated rotation differences $\phi_1$ and $\phi_2$ are used to calculate the frequency offset estimates $\hat{f}_1$ and $\hat{f}_2$, as it has also been described above. Alternatively, the frequency offset estimates $\hat{f}_1$ and $\hat{f}_2$ may be calculated directly in the frequency offset estimators 69 and 70, e.g. according to Equation 4. In that case phase detector 66 and calculating units 67 and 68 can be omitted. As mentioned above, it is also possible to use more than two estimators.

Next, in the frequency wrap calculator 71, the frequency periodicity or frequency wrap for each estimator is determined, according to Equation 8. When the frequency periodicities have been determined, the best combination of k-values, i.e. the k-values for which Equations 10a and 10b give equal, or in environments with noise and interference at least approximately equal results, can be determined in the calculating circuit 72. As mentioned above, one way to do this is to calculate f-values according to Equation 10a for the possible values of $k_1$ and correspondingly f-values according to Equation 10b for the possible values of $k_2$ and then compare the two sets of calculated f-values to find an f-value that is common for the two sets. In case of noise or interference the two f-values may not be exactly equal, but only approximately equal, so in that case the two f-values closest to each other and their corresponding k-values can be selected. Other ways of determining the best combination of k-values are described below. Finally, in the correcting unit 73 the common f-value corresponding to the selected (best) combination of k-values is selected as the corrected estimate $\hat{f}_{corr}$ of the frequency offset, or the corrected estimate $\hat{f}_{corr}$ is calculated from the selected combination of k-values. In the situation where two f-values are not exactly equal, either one of the values, an average value or a weighted average can be selected as the estimate of the frequency offset.

One other method to select the best combination of k-values is to find a maximum likelihood estimate. In the following, this method is generalized for two or more (n) frequency estimates. From Equation (12), the probability density function of the true frequency offset can be formed, for a given set of estimates $\hat{f}_i$ and for each combination of integers $k_i$:

$$p(f|\hat{f}_1 \ldots \hat{f}_n, k_1 \ldots k_n) = p(f|\hat{f}_1, k_1) \ldots p(f|\hat{f}_n, k_n), \quad (13)$$

assuming that the frequency estimates $\hat{f}_i$ are independent. Under the assumption of normal distributed frequency offset estimates, each of the terms on the right side of this equation can be written as $$p(f \mid \hat{f}_i, k_i) = \frac{1}{\sqrt{2\pi\sigma_i^2}} \exp\left(-\frac{1}{2\sigma_i^2}(f - \hat{f}_i - k_i M_i)^2\right), \quad (14)$$

where $\sigma_i$ is the estimation variances and $M_i$ is the size of the frequency wrap from Equation (12), i.e.

$$M_i = \frac{f_u N}{(m_{l_i+l'_i} - m_{l_i})}.$$

If for simplicity it is assumed that the estimation noise is Gaussian (the real distribution looks similar but has a more complicated expression, which depends on, among other things, the frequency offset estimation method), the logarithm of the probability density function will have a linear form:

$$\log p(f \mid \hat{f}_1 \ldots \hat{f}_n, k_1 \ldots k_n) = \text{constant} - \sum_i \frac{(f - \hat{f}_i - k_i M_i)^2}{2\sigma_i^2}. \quad (15)$$

For each combination of $k_i$-values the equation can be solved for the f that maximizes the probability density function by setting the first derivative of the function to zero, i.e.

$$f = \frac{\sum \frac{\hat{f}_i + k_i M_i}{\sigma_i^2}}{\sum \frac{1}{\sigma_i^2}}. \quad (16)$$

The respective f-values, i.e. those obtained from Equation (16) for each combination of $k_i$-values, can then be inserted in Equation (15), and the best f is given by the f that results in the highest probability. As mentioned, in the above example there are 35 combinations of $k_i$-values, for which Equations (15) and (16) are evaluated in. It is noted that only the ratios between the estimator variances need to be known, not the absolute variances.

Figure 8:
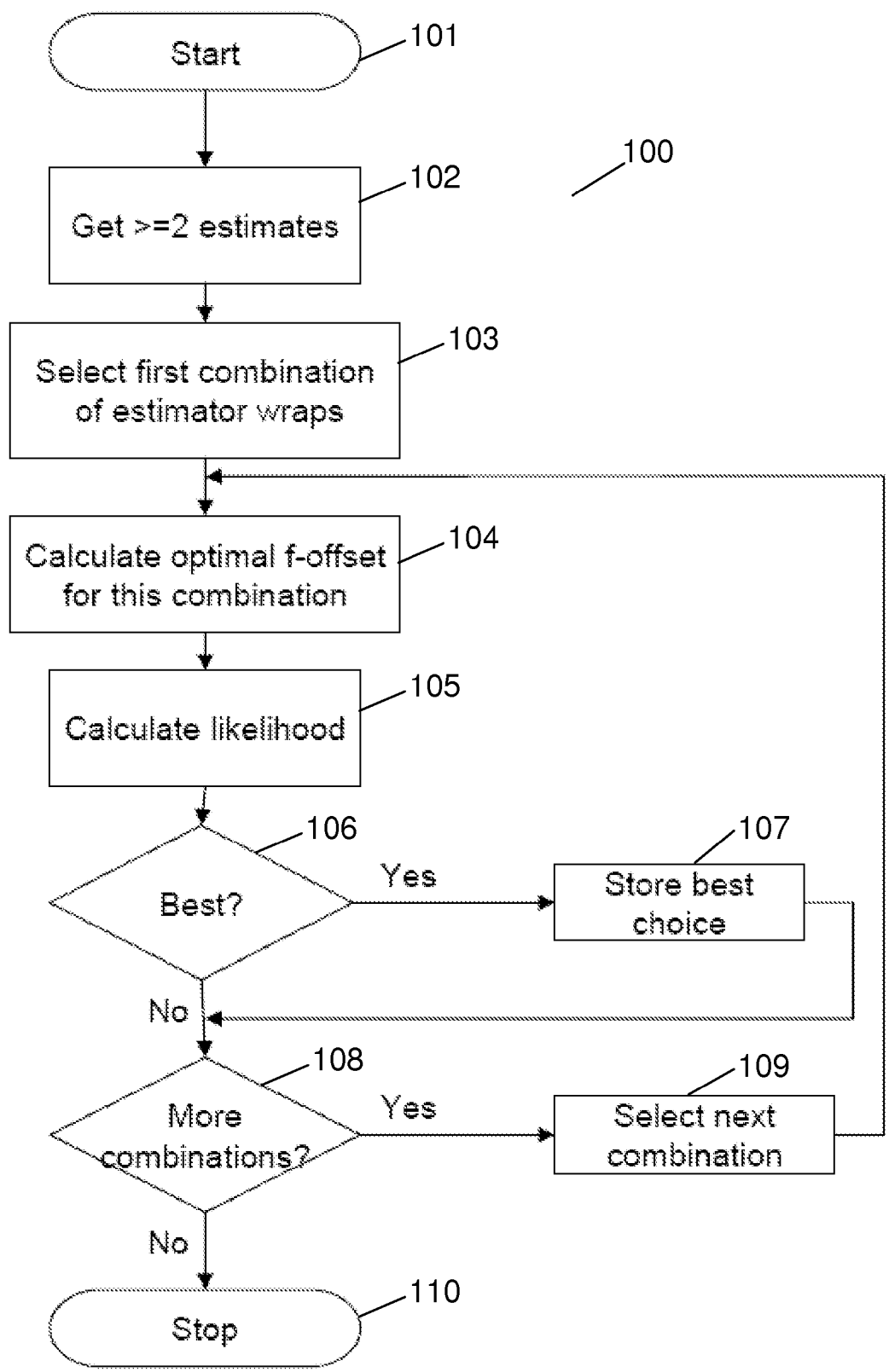
FIG. 8 shows a flow chart illustrating an embodiment in which a maximum likelihood for frequency offset values is calculated.

A flow chart 100 illustrating the procedure described above is shown in FIG. 8. The procedure starts in step 101. In step 102 the procedure gets the at least two frequency offset estimates, e.g. $\hat{f}_1$ and $\hat{f}_2$ or $\hat{f}_i$ from the estimators. In step 103 a first combination of $k_i$-values (e.g. $k_1=0$ and $k_2=0$) is selected. For this combination an optimal frequency offset value f is calculated according to Equation (16) in step 104. The result is then inserted in Equation (15) to calculate the likelihood or probability for this f-value in step 105. In step 106 it is then checked if the calculated probability is the best or highest value yet calculated. If so, it is stored as the best choice until now in step 107. Otherwise the value is not used. In step 108 it is then checked if the calculations have been performed for all combinations of $k_i$-values. If there are more combinations left, the next one is selected in step 109, and the above calculations (steps 104 to 106 and possibly step 107) are repeated for the new combination. When all combinations have been handled, the value latest stored in step 107 is used as the best estimate of the frequency offset, and the procedure stops in step 110.

Figure 9:
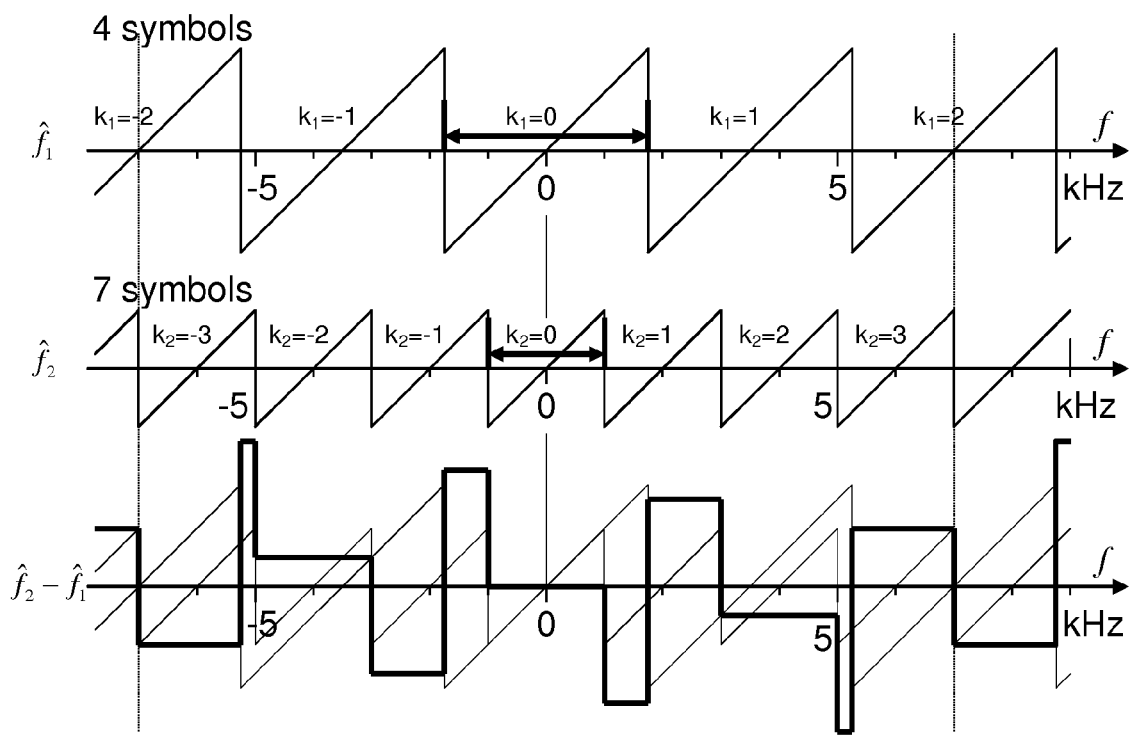
FIG. 9 illustrates a method in which a difference between estimates from different estimators is calculated and compared to a table.

Another method of selecting the correct values of $k_1$ and $k_2$ in Equations (10a/b) or the correct values of $k_i$ in Equation (12) is described in the following. From Equation (12) it can be seen that when the estimate $\hat{f}_i$ is shown as a function of the true frequency offset f, a saw tooth curve will appear. This is illustrated in the upper part of FIG. 9 showing the noise-free estimated frequency offset as a function of the true frequency offset for the 7-distance and 4-distance estimators. It is seen that in the range where $k_1=0$ and $k_2=0$ (i.e. from −1 kHz to 1 kHz) the two estimates are identical, while for frequency offset values outside this range, but still within the extended range from −7 kHz to 7 kHz, the two estimators will give different estimates. The lower part of FIG. 9 shows the difference $\hat{f}_2 - \hat{f}_1$ between the two estimates. It can be seen that within the range from −7 kHz to 7 kHz this function only has a limited number of different values, and each value is related to a specific range. Therefore, based on the value of this function, we can tell on which part of the curve we are, within the region from −7000 Hz to +7000 Hz. Using the example of FIG. 5, where the two estimates were found to be 125 Hz and 625 Hz, respectively, the difference $\hat{f}_2 - \hat{f}_1$ is −500 Hz. From FIG. 9 it can be seen that −500 Hz is related to the range 3 kHz to 5 kHz, i.e. the range where $k_1=1$ and $k_2=2$. In other words, the frequency offset can be estimated to 625 Hz+1·3500 Hz=4125 Hz or 125 Hz+2·2000 Hz=4125 Hz. The values of the difference function can be stored in a table, and by comparing the actual difference with the values in the table, the correct values of $k_1$ and $k_2$ can be determined. Therefore, this method can be called the table lookup method.

Again, in a noise free environment the actually measured difference will be equal to one of the values stored in the table, while in a more realistic noisy environment the table value closest to the actually measured difference can be selected.

Also this method can be extended to use more than two estimators with different distances between the pilots to further improve noise robustness.

Figure 10:
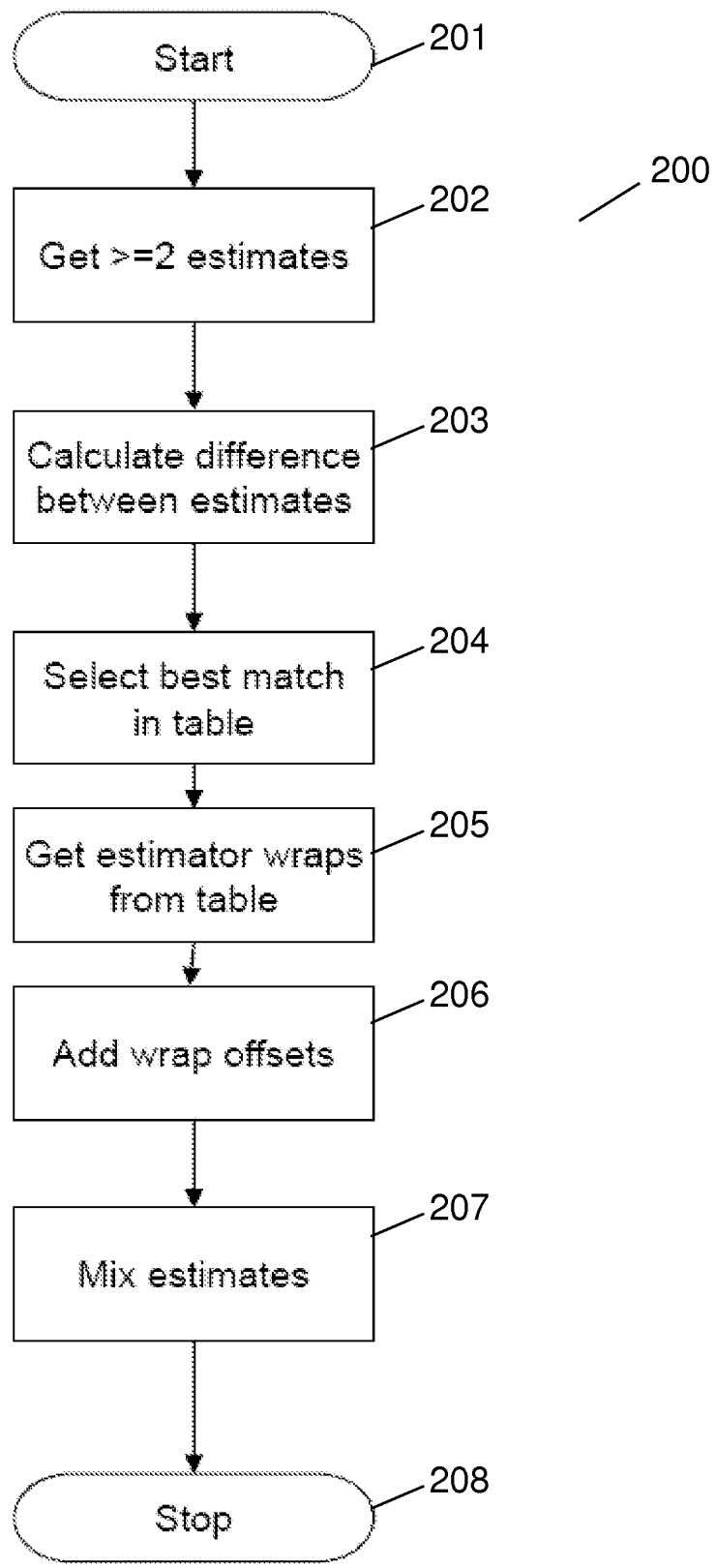
FIG. 10 shows a flow chart illustrating the method of FIG. 9.

A flow chart illustrating this method is shown in FIG. 10. The procedure starts in step 201. In step 202 the procedure gets the at least two frequency offset estimates, e.g. $\hat{f}_1$ and $\hat{f}_2$ from two estimators or $\hat{f}_i$ from each of the estimators. In step 203 the difference or differences between the estimates, e.g. $\hat{f}_2 - \hat{f}_1$, is/are calculated. The difference between the estimates from the two estimators is then in step 204 compared to a table, corresponding to the values of the stair-like curve in FIG. 9. The value that matches best is chosen, and based on that difference value the correct combination of $k_i$-values (e.g. $k_1=1$ and $k_2=2$) is determined in step 205. By adding the number of wraps corresponding to the determined $k_i$ values to the estimates, e.g. $\hat{f}_1$ and $\hat{f}_2$ or $\hat{f}_i$, the correct frequency offset f is then determined in step 206. In a noise free environment this will be the true frequency offset. However, in noisy environments the estimates may be inaccurate, and therefore a corrected frequency offset can be determined for each estimator by adding the determined number of wraps to the individual estimates. The corrected frequency offset values can then be mixed in step 207, e.g. with weights corresponding to their respective signal-to-noise ratios, to obtain the best estimate of the true frequency offset f.

In the above methods the correct match should be selected. In an environment with low signal-to-noise ratio, or if only a small bandwidth is used, e.g. with six resource blocks, the estimates will be noisier and there is a risk of wrong decision. To improve the methods in this situation, more estimates can be used, so that more differences can be compared. This is straightforward for the maximum likelihood method, and for the table lookup one more difference corresponds to matching to points in two dimensions instead of in one dimension. Averages over several slots can also be used to generate a better estimate. This can be implemented adaptively, such that if we detect that a large frequency change may have happened, then one or more additional slots can be measured, in order to not cause a false alarm.

To detect if the estimate is unreliable, it can for the maximum likelihood method be checked if the ratio between the largest and second largest value is too small, a so called log-likelihood ratio test. For the table lookup, it can be checked if we are too close to a decision boundary given e.g. by constructing a confidence interval. For both cases, the threshold value can be determined by a confidence level which depends on the estimator variances.

Figure 11:
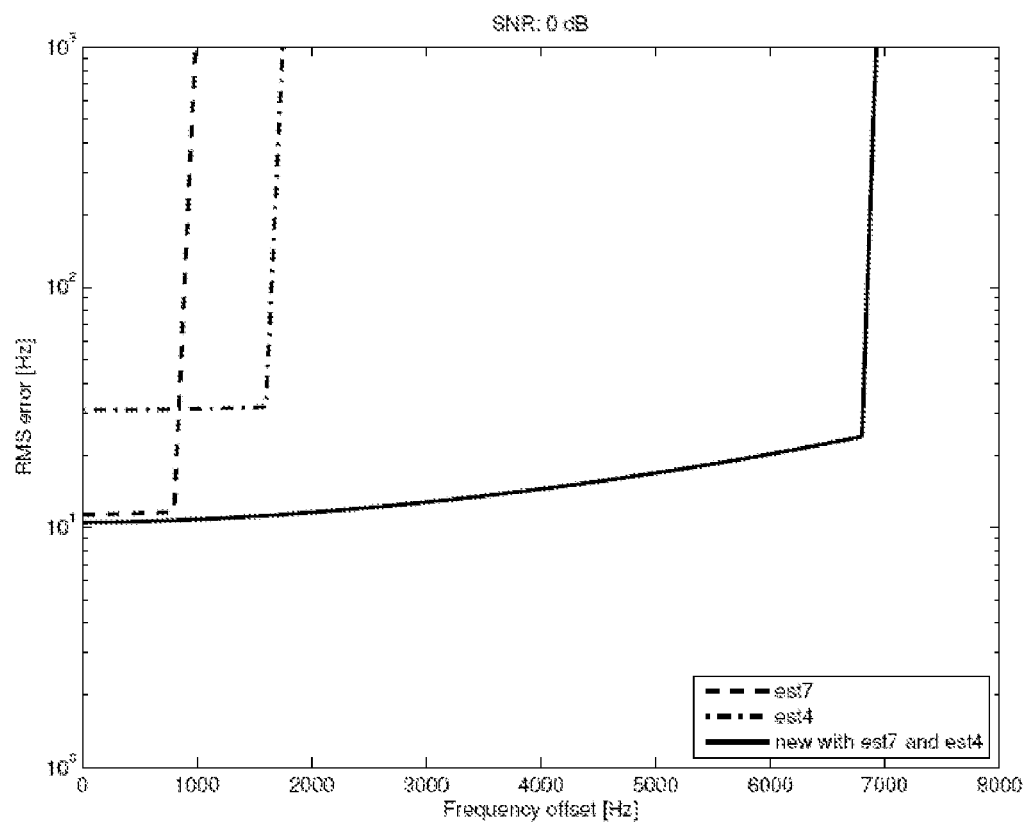
FIG. 11 shows simulation results illustrating advantages of embodiments of the invention.

Advantages of embodiments of the invention are illustrated in FIG. 11, which shows the root mean square (RMS) error of the frequency estimates, both before and after applying the embodiments of the invention, for a 20 MHz LTE system at 0 dB. The RMS error is shown for the 7-distance and the 4-distance estimators having Nyquist frequencies of 1 kHz and 1.75 kHz, respectively, and for the corresponding estimator according to embodiments of the invention, for which the Nyquist frequency was calculated to 7 kHz above. It can be seen that the new estimator actually can estimate frequency offsets up to about 7 kHz, which is much better than before. The RMS error increases with frequency, because of increased Inter-Carrier-Interference (ICI). The maximum likelihood method and the table lookup generate here identical performance.

The embodiments described here address Post-FFT frequency estimation in an LTE user equipment, but it is noted that the invention can also be applied to other embodiments, such as using Pre-FFT measurements from digital or analog signals; estimation in the uplink; or other communication systems. What is important is that two or more frequency estimates are given, where these are measured over different time spans.

As mentioned above, the frequency offset for the example of 3G LTE with 20 MHz bandwidth and short cyclic prefix (CP) length can be estimated by comparing the phase change between pilots having a distance of e.g. three, four or seven symbols. Since the pilots in symbol 0 and 4 are not placed on the same subcarriers, special arrangements, e.g. averaging between pilots placed on different subcarriers, can be used. It will be described below how this can be done.

Pilots transmitted on different sub-carriers are not well suited for direct frequency offset estimation because the phases for the different sub-carriers typically are affected in a different and unknown way, e.g. because the channel as such is frequency selective or because of a synchronization error. A given phase difference between two pilot symbols that are on two different sub-carriers and in different OFDM symbols might thus be caused by the channel, it might be caused by the frequency offset, or most likely it might be caused by a combination of both. However, the pilot symbols can be used in such a way that the effect of the sub-carrier frequency dependent phase rotation is cancelled, or the frequency dependent phase rotations can be estimated and taken into account. This is based on the assumption that when the sub-carriers of the chosen pilots are relatively close to each other, the frequency dependent phase rotation can be considered as a linear function, and it is illustrated in FIG. 12, which corresponds to FIG. 2.

Figure 12:
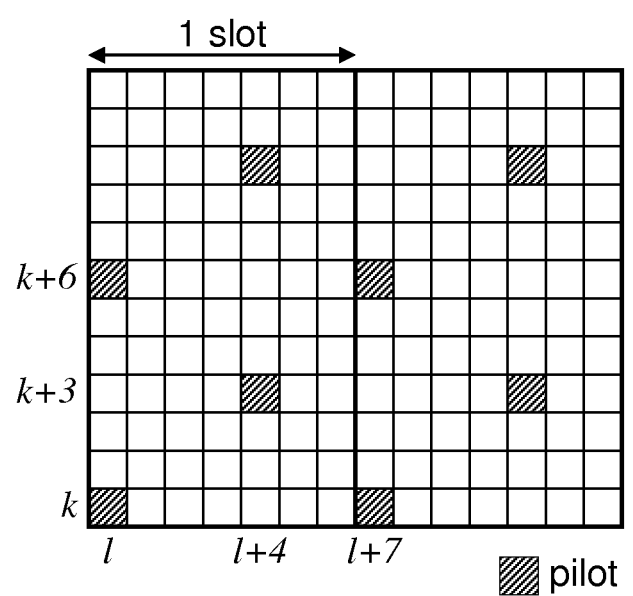
FIG. 12 illustrates the use of pilots on different sub-carriers.

If $p_{k,l}$ denotes the pilot that is transmitted on sub-carrier k in OFDM symbol l, it can be seen from FIG. 12 that the frequency offset estimated by comparing the phase change between pilots having a distance of seven symbols can be calculated from the pilots $p_{k,l}$ and $p_{k,l+7}$ in a well known way, since the two pilots are transmitted on the same sub-carrier. The phase change between pilots having a distance of four symbols can instead be calculated from the three pilots $p_{k,l}$, $p_{k+6,l}$ and $p_{k+3,l+4}$.

First, e.g. the pair of pilots $p_{k,l}$ and $p_{k+3,l+4}$ is used. This will result in a phase shift that is due to frequency offset plus the frequency dependent phase shift that is due to the pilots being three sub-carriers apart. Next, the pair $p_{k+6,l}$ and $p_{k+3,l+4}$ is used. Again this will result in a phase shift that is due to frequency offset plus the frequency dependent phase shift that is due to the pilots being three sub-carriers apart. The phase shift that is due to frequency offset will be the same in the two cases, while the phase shift that is dependent on the different sub-carrier frequencies will be of the same absolute size (the distance is 3 in both cases), but with different signs. Thus, by estimating the frequency offset based on the average phase difference the effect of a frequency dependent phase is removed.

However, it is also possible that the pilots of one of the pairs are taken from the same symbol. This effectively means that the phase rotation caused by the different sub-carriers can be estimated from a first pair of pilots chosen from one symbol and its effect subtracted from the total phase rotation found between another pair of pilots chosen from different symbols. Thus the frequency dependent phase rotation can first be estimated by considering pilots in the same OFDM symbol. Once this is estimated, pilots that are located on different sub-carriers and different symbols can be used for determining the frequency offset.

First, it is estimated how much the phase is changed if pilots at different subcarriers are used. Thus in FIG. 12 the phase difference between the two pilots from symbol l, i.e. the pilot at sub-carrier k+6 and the pilot at sub-carrier k, is determined. Again, it is assumed that the sub-carriers are sufficiently close to each other for the phase rotation to be considered as a linear function, and thus that from the measured phase rotation, which in FIG. 12 corresponds to a distance of six subcarriers, a phase rotation per sub-carrier or for three sub-carriers can easily be calculated. Next, the total phase shift between pilots at different sub-carriers and different OFDM symbols is measured. In FIG. 12 e.g. the phase difference between the pilots from symbol l, sub-carrier k and symbol l+4, sub-carrier k+3 can be determined. Finally, the estimated impact of the fact that estimation is done on different sub-carriers is subtracted from the measured phase shift.

Although various embodiments of the present invention have been described and shown, the invention is not restricted thereto, but may also be embodied in other ways within the scope of the subject-matter defined in the following claims.

The invention claimed is:

1. A method of estimating a frequency offset of a received signal comprising a number of subsequently received data symbols, the method comprising the step of determining a first estimate of said frequency offset from a calculated change in phase of the received signal between two received symbols having a first time distance between them, wherein the method further comprises the steps of:
- determining at least one further estimate of said frequency offset from a calculated change in phase of the received signal between two received symbols having a time distance between them, which is different from said first time distance;
- determining for each of said first and further estimates a frequency periodicity from the distance between the two received symbols from which the estimate was determined;
- determining a set of integer values comprising an integer value for each of said first and further estimates so that frequency values calculated for each estimate as a respective frequency periodicity of the frequency periodicity estimates multiplied by a respective integer value of the integer values of the estimates added to the respective estimate are at least approximately equal to each other; and
- calculating from the determined set of integer values a corrected estimate of said frequency offset.

2. The method according to claim 1, wherein the step of determining a set of integer values for each estimate comprises the steps of:
- calculating for each estimate and for each of a number of integer values a corresponding frequency value; and
- comparing the frequency values calculated for different estimates and selecting the integer values for each estimate giving frequency values closest to each other.

3. The method according to claim 1, wherein the steps of determining a set of integer values for each estimate and calculating a corrected estimate of said frequency offset comprise the steps of:
- calculating for each of a number of combinations of integer values an optimal frequency value as a frequency value that maximizes a probability function;
- calculating a likelihood for each optimal frequency value; and
- selecting the optimal frequency value having the largest likelihood as a corrected estimate of said frequency offset.

4. The method according to claim 1, wherein the steps of determining a set of integer values for each estimate and calculating a corrected estimate of said frequency offset comprise the steps of:
- calculating at least one difference between said first and further estimates;
- comparing the at least one difference to pre-calculated difference values stored in a table, which for each pre-calculated difference value indicates a corresponding set of integer values; and
- reading in said table the set of integer values corresponding to the at least one calculated difference.

5. The method according to claim 4, wherein the step of calculating a corrected estimate of said frequency offset further comprises the step of:
- calculating from the set of integer values read in said table a corrected estimate of said frequency offset for each of said first and further estimates.

6. The method according to claim 2, further comprising the step of:
- selecting a frequency value corresponding to one of the integer values in the determined set of integer values as the corrected estimate of said frequency offset.

7. The method according to claim 2, further comprising the steps of:
- calculating an average value of frequency values corresponding to the integer values in the determined set of integer values; and
- selecting said average value as the corrected estimate of said frequency offset.

8. The method according to claim 2, further comprising the steps of:
- calculating a weighted average value of frequency values corresponding to the integer values in the determined set of integer values; and
- selecting said weighted average value as the corrected estimate of said frequency offset.

9. The method according to claim 2, further comprising the step of:
- mixing frequency values corresponding to the integer values in the determined set of integer values with weights corresponding to respective signal-to noise ratios to obtain the corrected estimate of said frequency offset.

10. A receiver arranged to estimate a frequency offset of a received signal comprising a number of subsequently received data symbols, the receiver comprising a first frequency offset estimator configured to determine a first estimate of said frequency offset from a calculated change in phase of the received signal between two received symbols having a first time distance between them,
wherein the receiver further comprises:
- at least one further frequency offset estimator configured to determine at least one further estimate of said frequency offset from a calculated change in phase of the received signal between two received symbols having a time distance between them, which is different from said first time distance;
- a frequency wrap calculator configured to determine for each of said first and further estimates a frequency periodicity from the distance between the two received symbols from which the estimate was determined;
- a calculating circuit configured to determine a set of integer values comprising an integer value for each of said first and further estimates so that frequency values calculated for each estimate as a respective frequency periodicity of the frequency periodicity estimates multiplied by a respective integer value of the integer values of the estimates added to the respective estimate are at least approximately equal to each other; and
- a correcting unit configured to calculate, from the determined set of integer values, a corrected estimate of said frequency offset.

11. The receiver according to claim 10, wherein the receiver is configured to determine the set of integer values for each estimate by:
- calculating for each estimate and for each of a number of integer values a corresponding frequency value; and
- comparing the frequency values calculated for different estimates and selecting the integer values for each estimate giving frequency values closest to each other.

12. The receiver according to claim 10, wherein the receiver is configured to determine the set of integer values for each estimate and calculate a corrected estimate of said frequency offset by:
- calculating for each of a number of combinations of integer values an optimal frequency value as a frequency value that maximizes a probability function;
- calculating a likelihood for each optimal frequency value; and selecting the optimal frequency value having the largest likelihood as a corrected estimate of said frequency offset.

13. The receiver according to claim 10, wherein the receiver is configured to determine the set of integer values for each estimate and calculate a corrected estimate of said frequency offset by:
    calculating at least one difference between said first and further estimates;
    comparing the at least one difference to pre-calculated difference values stored in a table, which for each pre-calculated difference value indicates a corresponding set of integer values; and
    reading in said table the set of integer values corresponding to the at least one calculated difference.

14. The receiver according to claim 13, further configured to calculate a corrected estimate of said frequency offset by:
    calculating from the set of integer values read in said table a corrected estimate of said frequency offset for each of said first and further estimates.

15. The receiver according to claim 11, further configured to:
    select a frequency value corresponding to one of the integer values in the determined set of integer values as the corrected estimate of said frequency offset.

16. The receiver according to claim 11, further configured to:
    calculate an average value of frequency values corresponding to the integer values in the determined set of integer values; and
    select said average value as the corrected estimate of said frequency offset.

17. The receiver according to claim 11, further configured to:
    calculate a weighted average value of frequency values corresponding to the integer values in the determined set of integer values; and
    select said weighted average value as the corrected estimate of said frequency offset.

18. The receiver according to claim 11, further configured to:
    mix frequency values corresponding to the integer values in the determined set of integer values with weights corresponding to respective signal-to-noise ratios to obtain the corrected estimate of said frequency offset.

19. A user equipment comprising a receiver according to claim 10.

20. A non-transitory computer readable medium having stored thereon program code for performing a method when said program code is run on a computer, wherein the method is a method of estimating a frequency offset of a received signal comprising a number of subsequently received data symbols, the method comprising the step of determining a first estimate of said frequency offset from a calculated change in phase of the received signal between two received symbols having a first time distance between them, and wherein the method further comprises the steps of:
    determining at least one further estimate of said frequency offset from a calculated change in phase of the received signal between two received symbols having a time distance between them, which is different from said first time distance;
    determining for each of said first and further estimates a frequency periodicity from the distance between the two received symbols from which the estimate was determined;
    determining a set of integer values comprising an integer value for each of said first and further estimates so that frequency values calculated for each estimate as a respective frequency periodicity of the frequency periodicity estimates multiplied by a respective integer value of the integer values of the estimates added to the respective estimate are at least approximately equal to each other; and
    calculating from the determined set of integer values a corrected estimate of said frequency offset.

\* \* \* \* \*

UNITED STATES PATENT AND TRADEMARK OFFICE
CERTIFICATE OF CORRECTION

PATENT NO. : 8,744,020 B2  Page 1 of 1
APPLICATION NO. : 13/127044
DATED : June 3, 2014
INVENTOR(S) : Andgart et al.

It is certified that error appears in the above-identified patent and that said Letters Patent is hereby corrected as shown below:

In the Specification:

In Column 5, Line 22, delete "$f_u$," and insert -- $f_u$ --, therefor.

In Column 12, Line 9, delete "$k_1$-values." and insert -- $k_i$-values. --, therefor.

Signed and Sealed this
Twenty-third Day of September, 2014

Michelle K. Lee
*Deputy Director of the United States Patent and Trademark Office*